United States Patent
Kim et al.

(10) Patent No.: US 7,933,320 B2
(45) Date of Patent: *Apr. 26, 2011

(54) COMMUNICATION SYSTEM USING LENGTH SHIFT KEYING MODULATION METHOD

(75) Inventors: Jae-hyon Kim, Suwon-si (KR); Young-hwan Kim, Hwaseong-si (KR); Seong-soo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1150 days.

This patent is subject to a terminal disclaimer.

(21) Appl. No.: 11/499,700

(22) Filed: Aug. 7, 2006

(65) Prior Publication Data

US 2007/0121735 A1    May 31, 2007

(30) Foreign Application Priority Data

Nov. 29, 2005  (KR) .................. 10-2005-0114901

(51) Int. Cl.
*H04B 1/38* (2006.01)
*H04L 5/16* (2006.01)

(52) U.S. Cl. ........ 375/223; 375/271; 332/155; 332/156; 332/157; 332/158

(58) Field of Classification Search ................. 375/223, 375/271; 32/155–158
See application file for complete search history.

(56) References Cited

U.S. PATENT DOCUMENTS

| | | | | |
|---|---|---|---|---|
| 4,815,106 | A * | 3/1989 | Propp et al. | 375/257 |
| 4,975,654 | A * | 12/1990 | Becker et al. | 329/347 |
| 5,455,570 | A * | 10/1995 | Cook et al. | 340/825.22 |
| 2006/0023797 | A1 * | 2/2006 | Machimura et al. | 375/259 |

* cited by examiner

*Primary Examiner* — Curtis B Odom
(74) *Attorney, Agent, or Firm* — Sughrue Mion, PLLC

(57) ABSTRACT

A communication system using a length shift keying (LSK) modulation method provides a transmitter having a carrier signal generator for generating carrier signals, and a modulator for modulating lengths of the carrier signals from the carrier signal generator according to combinations of data bits, and a receiver having an integrator for calculating an energy value by integrating the carrier signal that corresponds to a data bit combination, and a data judgment unit for judging the data bit combination by comparing the energy value with a predetermined threshold value. Power is maintained without changing the bandwidth of a communication signal when the communication signal is modulated.

23 Claims, 4 Drawing Sheets

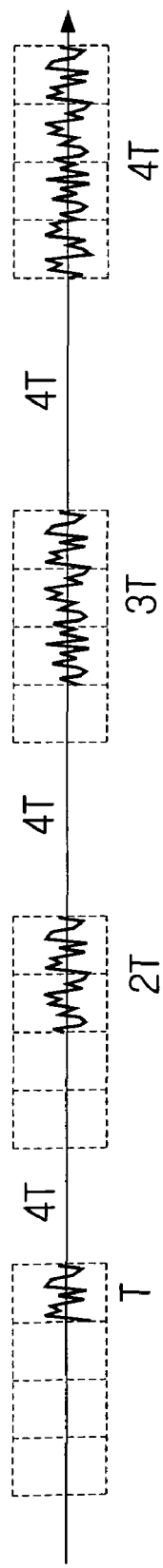
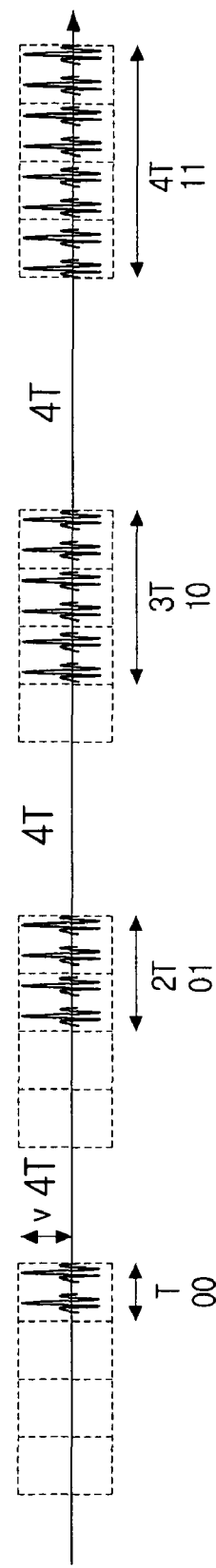
FIG. 2A
FIG. 2B

COMMUNICATION SYSTEM USING LENGTH SHIFT KEYING MODULATION METHOD

This application claims priority from Korean Patent Application No. 10-2005-0114901, filed on Nov. 29, 2005, in the Korean Intellectual Property Office, the disclosure of which is incorporated herein by reference.

BACKGROUND OF THE INVENTION

1. Field of the Invention

The present invention relates to a communication system using a length shift keying (LSK) modulation method, and more particularly, to a communication system using an LSK modulation method which can minimize the structural change of the system and thus reduce its manufacturing cost by maintaining constant carrier signal power during modulation of carrier signals.

2. Description of the Related Art

Generally, spread spectrum communication is a method of spreading out a signal to be transmitted so that the signal has a much wider bandwidth than the original signal and transmitting the spread signal. Spread spectrum communication may be classified into a method of using a carrier signal of a narrow band that has a predetermined period such as a code division multiple access (CDMA) system and a method of using a carrier signal of a wide band. The method of using the narrow-band carrier signal is a method of performing frequency modulation so that the frequency band of information to be transmitted becomes narrower than the frequency band of the carrier signal. The method of using a wide-band carrier signal is a method of performing a frequency modulation so that the frequency band of the information to be transmitted becomes wider than the frequency band of the carrier signal.

Sine waves or impulse signals have been mainly used as a carrier signal in such a spread spectrum communication method, and recently, a method of transmitting information using a chaotic signal has been proposed according to the recommendations of the IEEE 802.15.4a standard.

In the spread spectrum communication, the carrier signal to be transmitted is modulated by diverse methods so that a receiver can accurately judge the received data. Carrier signal modulation methods include an amplitude shift keying (ASK) modulation method that modulates the amplitude of a carrier signal, a frequency shift keying (FSK) modulation method that modulates the frequency of a carrier signal, and a phase shift keying (PSK) modulation method that modulates the phase of a carrier signal.

The ASK modulation method is a method of modulating the amplitude of the carrier signal with the signal length of the carrier signal kept constant, and changes the amplitude of the carrier signal according to data bits that express data with "0" or "1". According to this ASK modulation method, when the amplitude of the carrier signal is modulated, the power of the carrier signal is increased.

The FSK modulation method is a method of modulating the frequency of the carrier signal with the signal length of the carrier signal kept constant, and increases or decreases the frequency according to information bits, so that a receiver can discriminate the information bits according to the frequency. According to the FSK modulation method, however, when the frequency of the carrier signal is increased, the power of the carrier signal is also increased.

The PSK modulation method is a method of modulating the phase of the carrier signal to be transmitted by 180° according to the information bits. According to the PSK modulation method, when the phase of the carrier signal is modulated, the power of the carrier signal is increased in the same manner as other modulation method as described above.

As described above, according to the ASK modulation method, the FSK modulation method, and the PSK modulation method, the amplitude, the frequency, or the phase of the carrier signal is modulated so that the receiver can discriminate the received data, and the power of the carrier signal is increased.

However, since the power of the carrier signal that can be received by the receiver is generally fixed, the capacity of the receiver should be increased in order to receive the carrier signal having a high-level power. In addition, since the hardware construction of the receiver should be changed according to the modulation method for modulating the amplitude, frequency, or phase of the carrier signal, the hardware construction of the receiver becomes complicated and the manufacturing cost thereof is increased.

Accordingly, a method is needed that can modulate the carrier signal without increasing the power of the carrier signal and a method that can reduce the change of the receiver construction required for different modulation methods.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a communication system using an LSK modulation method which can minimize the structural change of the system and thus reduce its manufacturing cost by maintaining power of a carrier signal constant during modulation of the carrier signal.

According to an aspect of the present invention, there is provided a communication system using a length shift keying (LSK) modulation method, which comprises a transmitter that adjusts lengths of carrier signals for transmitting data in a time domain according to combinations of data bits, and generates a communication signal including the carrier signals.

The transmitter may comprise a carrier signal generator for generating the carrier signals, and a modulator for modulating the lengths of the carrier signals from the carrier signal generator according to the combinations of the data bits and outputting the modulated carrier signals.

The modulator may have information on the combinations of the preset data bits and the lengths of the carrier signals that are differently set to correspond to the combinations of the data bits.

The number of combinations of the data bits stored in the modulator and the number of kinds of carrier signals may be one of square multiples of 4 that include 4, 16, 64, and so on.

The modulator may output the carrier signals which have the lengths that correspond to the data bits by turning on a switch according to the data bits.

The carrier signals may have the different lengths at integer times according to the data bits.

The modulator may generate an interval where no carrier signal exists between the neighboring carrier signals by turning off the switch.

The interval may be longer than or equal to the length of the longest carrier signal among the carrier signals.

The communication system may include a receiver that receives a communication signal generated from the modulator, and judges the data bits according to the lengths of the carrier signals included in a specified section of the communication signal.

The receiver may include an integrator for calculating an energy value by integrating the carrier signal that corresponds to one data bit, and a data judgment unit for judging the data bit by comparing the energy value with a predetermined threshold value.

The integrator may set a range of the carrier signal that corresponds to one data bit using a window having the same length as that of the longest carrier signal among the carrier signals.

The data judgment unit may have threshold values the number of which is the same as that of the combinations of the data bits stored in the modulator.

The respective threshold values may be set to successive values arranged at predetermined intervals.

The carrier signal generator may generate at least one of a chaotic signal, an impulse signal, and a spreading sequence signal.

BRIEF DESCRIPTION OF THE DRAWINGS

The above and other aspects of the present invention will be more apparent by describing certain exemplary embodiments of the present invention with reference to the accompanying drawings, in which:

FIGS. 2A to 2C are waveform diagrams of a chaotic signal, an impulse signal, and a spreading sequence signal when a communication system of FIG. 1 transmits carrier signals according to data bits of 11, 10, 01, and 00.

DETAILED DESCRIPTION OF THE EXEMPLARY EMBODIMENTS

Figure 1:
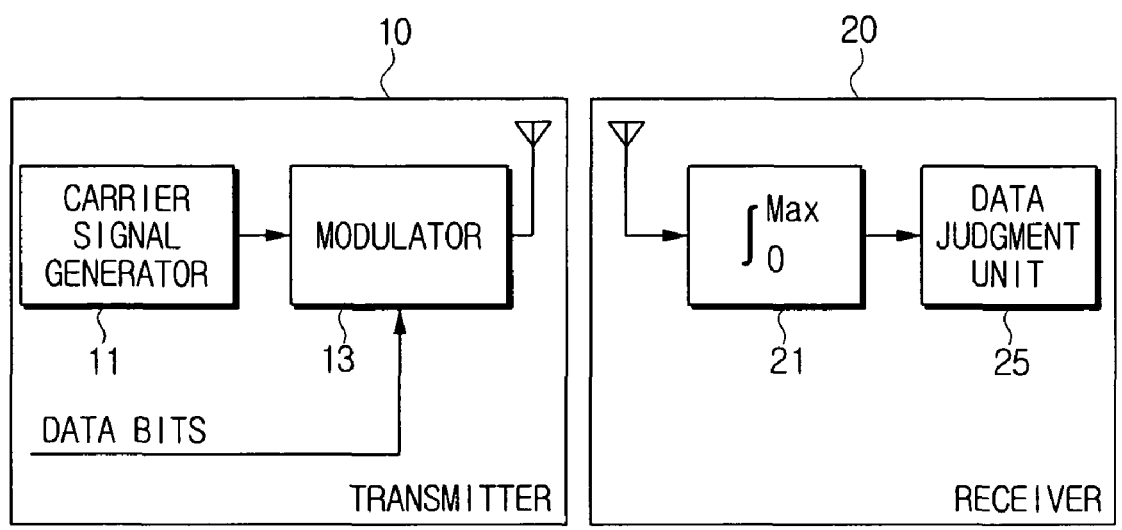
FIG. 1 is a block diagram illustrating the construction of an LSK modulation type communication system according to an exemplary embodiment of the present invention.

Certain non-limiting exemplary embodiments of the present invention will be described in greater detail with reference to the accompanying drawings. In the whole description of the present invention, the same drawing reference numerals are used for the same elements across various figures. The conventional elements or their detailed description will be omitted if it is determined that they impede the subject matter of the present invention.

FIG. 1 is a block diagram illustrating the construction of an LSK modulation type communication system according to an exemplary embodiment of the present invention. As illustrated in FIG. 1, the length shift keying (LSK) modulation type communication system according to an exemplary embodiment of the present invention includes a transmitter 10 that modulates carrier signal lengths according to data bits, and a receiver 20 that receives the data bits according to the lengths of the carrier signals transmitted from the transmitter 00.

The transmitter 10 includes a carrier signal generator 11 and a modulator 13.

The carrier signal generator 11 may be one of a chaotic signal generator, an impulse signal generator, and a spreading sequence signal generator according to the kinds of carrier signals.

The chaotic signal generator generates chaotic signals having a specified characteristic in order to transmit data, and is generally implemented using a chaotic dynamic system. This chaotic signal generator generates the chaotic signals directly from a frequency band for data transmission, and also generates the chaotic signals from predetermined RF signals, microwaves, infrared rays, and visible rays.

The impulse signal generator continuously generates impulse signals arranged at predetermined intervals.

The spreading sequence signal generator generates inherent codes or PN codes (i.e., spread codes) that are mainly used in a code division multiple access (CDMA) system.

The modulator 13 receives data bits composed of zeros or ones ("0" or "1"), and adjusts the lengths of the carrier signals generated from the carrier signal generator 11 according to the data bits to transmit the adjusted carrier signals. The modulator 13 has information on the lengths of the carrier signals that correspond to the respective data bits. In this case, the modulator 13 sets the combinations of the data bits the number of which corresponds to the number of square multiples of 4 that include 4, 16, 64, and so on, and sets the carrier signal lengths the number of which is the same as the number of combinations of the data bits.

For example, in the case where four combinations of data bits are set to 00, 01, 10, and 11, the modulator 13 can adjust the carrier signal lengths so that the number of carrier signal lengths becomes four to correspond to the respective data bits. In this case, the modulator 13 may set the carrier signal lengths to 1T through 4T, or 0.5T, 1.0T, 1.5T, and 2.0T, or 1T, 2T, 4T, and 8T.

A specified interval where no carrier signal exists is inserted between the respective carrier signals, and in this case, the length of the interval is set to be equal to or longer than the length of the longest carrier signal among the carrier signals generated from the modulator 13. In the receiver 20, a window having the same length as the longest carrier signal is used to discriminate the carrier signals. If the length of the interval is set to be equal to or longer than the longest carrier signal, an error, which may occur due to the neighboring carrier signals that simultaneously exist in one moving window when the carrier signals are judged, can be prevented.

Figure 2C:
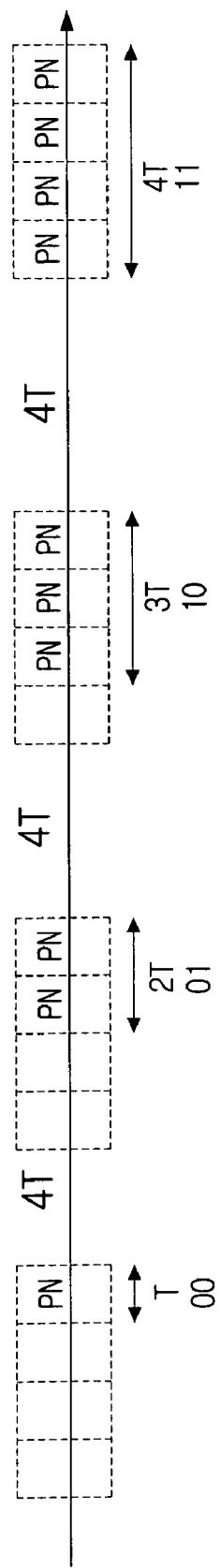

FIGS. 2A to 2C are waveform diagrams of a chaotic signal, an impulse signal, and a spreading sequence signal when a communication system of FIG. 1 transmits carrier signals according to data bits of 11, 10, 01, and 00.

As shown in FIG. 2A, as the data bits are input in the order of 11, 10, 01, and 00, chaotic signals transmitted from the transmitter have the lengths of 4T, 3T, 2T, and 1T, respectively. In this case, the interval between the chaotic signals is set to 4T.

FIGS. 2B and 2C illustrate waveforms appearing when the impulse signals and PN codes of the spreading sequence signals are modulated and transmitted by the LSK modulation method according to exemplary embodiments of the present invention. In the same manner as the chaotic signals, the lengths of the impulse signals and the spreading sequence signals being transmitted are set to 4T, 3T, 2T, and 1T, and the interval between the respective signals is set to 4T.

Tetragons drawn by dotted lines in FIGS. 2A to 2C indicate windows, and the length of a window corresponds to a unit of window movement.

Figure 3:
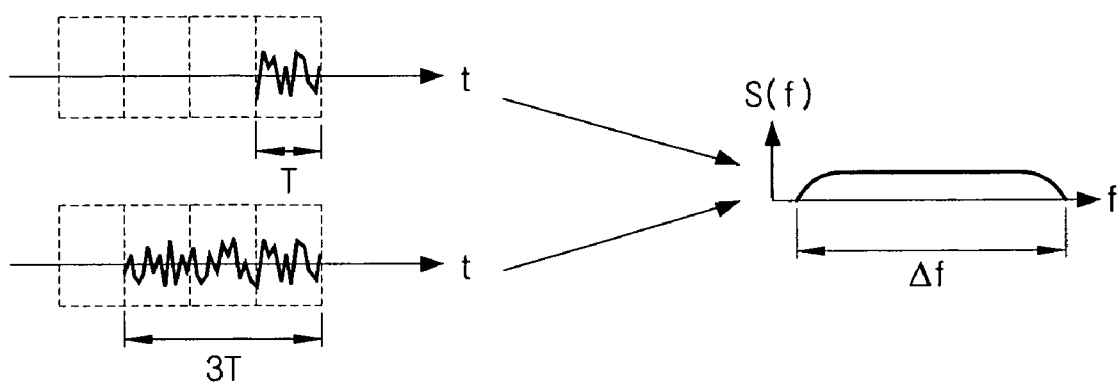
FIG. 3 is a waveform diagram illustrating the relation between the length of a carrier signal modulated according to the LSK modulation method and a bandwidth according to an exemplary embodiment of the present invention.

FIG. 3 is a waveform diagram illustrating the relation between the length of a carrier signal modulated according to the LSK modulation method and a bandwidth according to the present invention.

According to the LSK modulation method according to exemplary embodiments of the present invention. If the lengths of the carrier signals differ according to the data bits, the transmitted carrier signals have diverse lengths, but the bandwidth occupied in the case where the length of the carrier signal is 1T is the same as the bandwidth occupied in the case where the length of the carrier signal is 3T. That is, the characteristics of the bandwidths are not changed because the bandwidths occupied by the respective carriers are larger than the frequency bandwidths caused by data carried on the carrier signals.

Accordingly, the LSK modulation method according to exemplary embodiments of the present invention can be applied to the chaotic signals, impulse signals and spreading sequence signals if the bandwidths of the carrier signals are larger than those of the data. The LSK modulation method according to exemplary embodiments of the present invention can also be applied to any signal the bandwidth of which is not changed even if the length of the carrier signal is changed.

The LSK modulation type receiver 20 includes an integrator 21 and a data judgment unit 25.

The integrator 21 calculates energy values by integrating the received communication signal in a specified comparison unit. In this case, it is preferable that the comparison unit is set to the length of the longest carrier signal among the carrier signals determined by the modulator 13 of the transmitter 10. This is to prevent interference occurring between the neighboring carrier signals when the data judgment unit to be explained later compares the energy values, in the same manner as the setting of the interval between the carrier signals to the length of the longest carrier signal through the modulator 13.

The integrator 21 sets the section of the carrier signal that corresponds to one data bit using the windows, in order to calculate the energy values, and the size of the window is equal to the size of the comparison unit. The integrator 21 moves the window in a movement unit that corresponds to the length of the shortest carrier signal. In this case, the number of movement units in one window is equal to the number of combinations of data bits. For example, when the modulator sets four combinations of data bits, four movement units are included in one window. If the carrier signal reaches the last movement unit along with the movement direction of the window, the integrator 21 calculates the energy values by integrating all the carrier signals included in the window.

The data judgment unit 25 judges the data bits by comparing the energy values in a comparison unit that are calculated by the integrator 21 with a predetermined threshold value. In this case, the data judgment unit 25 has a plurality of threshold values according to the combinations of data bits. For example, if four combinations of data bits exist, the data judgment unit 25 has four threshold values for discriminating the carrier signals of 1T, 2T, 3T, and 4T that correspond to the data bits of 00, 01, 10, and 11. Accordingly, the data judgment unit 25 judges the data bits by comparing the energy values calculated by the integrator 21 with the four threshold values, which are set to be successively increased at predetermined intervals. Here, for example, the smallest threshold value to the largest threshold value are called first to fourth threshold values.

In judging the data bits, the data judgment unit 25 judges whether the energy value is larger than the first threshold value that is the smallest threshold value. If the energy value is smaller than the first threshold value, the data judgment unit 25 judges the corresponding section is the interval between the carrier signals where no carrier signal exists. If the energy value is larger than the first threshold value, the data judgment unit 25 then compares the energy value with the second threshold value. If the energy value is smaller than the second threshold value, the data judgment unit 25 judges the corresponding data bit as 00, while if the energy value is larger than the second threshold value, it compares the energy value with the third threshold value. If the energy value is smaller than the third threshold value, the data judgment unit 25 judges the corresponding data bit as 01, while if the energy value is larger than the third threshold value, it compares the energy value with the fourth threshold value. If the energy value is smaller than the fourth threshold value, the data judgment unit 25 judges the corresponding data bit as 10, while if the energy value is larger than the fourth threshold value, it judges the corresponding data bit as 11.

A process of transmitting/receiving the communication signal using the LSK modulation type communication system as constructed above will now be explained.

The carrier signal generator 11 of the transmitter 10 generates and provides carrier signals to the modulator 13. The modulator 13 controls an output period of the carrier signals output according to the input data bits. For example, if the data bits are input to the modulator 13 in the order of 11, 10, 01, and 00, the modulator 13 successively outputs the carrier signals with lengths 4T, 3T, 2T, and 1T, respectively.

The modulator 13 outputs the carrier signal having length 4T that corresponds to the data bit of 11, and then stops the output of the carrier signal for a time of 4T to provide an interval. Then, the modulator 13 outputs the carrier signal having length 3T that corresponds to the data bit of 10, and then stops the output of the carrier signal for a time of 4T to provide an interval. The modulator 13 then outputs the carrier signal having length 2T that corresponds to the data bit of 01, and then stops the output of the carrier signal for a time of 4T to provide an interval. Last, the modulator 13 outputs the carrier signal having length 1T that corresponds to the data bit of 00, and then stops the output of the carrier signal for a time of 4T.

Through the above-described process, the communication signals as shown in FIGS. 2a to 2c are generated.

If the communication signal is received in the receiver 20, the integrator 21 sets a section in which the energy value of the carrier signal in the comparison unit is calculated as moving the window in a movement unit, and calculates the energy value of the corresponding section. Then, the data judgment unit 25 judges the data bits by comparing the energy value with the predetermined threshold values as described above.

In the communication system using the LSK modulation method according to exemplary embodiments of the present invention, the combinations of data bits are set to square multiples of 4 that include 4, 16, 64, and so on, and the lengths of the carrier signals to be transmitted are adjusted so that the lengths of the carrier signals correspond to the combinations of data bits. Accordingly, the receiver 20 discriminates the data bits according to the lengths of the data bits.

As described above, according to exemplary embodiments of the present invention, since the power is maintained without changing the bandwidth of the communication signal when the communication signal is modulated, the communication signal can be modulated by a communication system having a simple construction. Accordingly, the communication system can be simply implemented with a reduced manufacturing cost.

The foregoing embodiments and advantages are merely exemplary and are not to be construed as limiting the present invention. The present teaching can be readily applied to other types of apparatuses. Also, the descriptions of the exemplary embodiments of the present invention are intended to be illustrative, and not to limit the scope of the claims, and many alternatives, modifications, and variations will be apparent to those skilled in the art.

What is claimed is:

1. A communication system using a length shift keying (LSK) modulation method, the communication system comprising a transmitter that adjusts lengths of carrier signals for transmitting data in a time domain according to predetermined combinations of data bits, and generating a communication signal including the carrier signals having the adjusted lengths,
wherein the carrier signal is adjusted to a different lengths according to each predetermined combination of data bits.

2. The communication system as claimed in claim 1, wherein the transmitter comprises:
a carrier signal generator that generates the carrier signals; and
a modulator that modulates the lengths of the carrier signals generated by the carrier signal generator according to the combinations of the data bits, and outputs the communication signal including the modulated carrier signals.

3. The communication system as claimed in claim 2, wherein the modulator has information on the combinations of the data bits and the lengths of the carrier signals set to correspond to the combinations of the data bits.

4. The communication system as claimed in claim 2, wherein the number of combinations of the data bits stored in the modulator and the number of kinds of carrier signals are a square multiple of 4.

5. The communication system as claimed in claim 2, wherein the carrier signals have different lengths at integer times according to the data bits.

6. The communication system as claimed in claim 2, wherein the modulator generates an interval in which no carrier signal exists between neighboring carrier signals by stopping the output of the carrier signal.

7. The communication system as claimed in claim 6, wherein the interval is longer than or equal to a length of a longest carrier signal among the carrier signals.

8. The communication system as claimed in claim 2, further comprising a receiver which receives the communication signal generated by the modulator, and judges the data bits according to the lengths of the carrier signals included in a specified section of the communication signal.

9. The communication system as claimed in claim 1, wherein a number of the predetermined combinations of data bits is represented by at least two sequence of numbers using '0' or '1'.

10. A communication system using a length shift keying (LSK) modulation method, the communication system comprising:
a transmitter that adjusts lengths of carrier signals for transmitting data in a time domain according to combinations of data bits, and generates a communication signal including the carrier signals having the adjusted lengths,
wherein the transmitter comprises:
a carrier signal generator that generates the carrier signals; and
a modulator that modulates the lengths of the carrier signals generated by the carrier signal generator according to the combinations of the data bits, and outputs the communication signal including the modulated carrier signals; and
a receiver which receives the communication signal generated by the modulator, and judges the data bits according to the lengths of the carrier signals included in a specified section of the communication signal,
wherein the receiver comprises:
an integrator that calculates an energy value by integrating the carrier signal that corresponds to a data bit combination; and
a data judgment unit that judges the data bit combination by comparing the energy value with a threshold value.

11. The communication system as claimed in claim 10, wherein the data judgment unit has a number of threshold values which is equal to a number of the combinations of the data bits stored in the modulator.

12. The communication system as claimed in claim 11, wherein the respective threshold values are set to have successive values at a predetermined interval between neighboring threshold values, according to the corresponding combinations of the data bits.

13. The communication system as claimed in claim 10, wherein the integrator sets a range of the lengths of the carrier signal that corresponds to a data bit combination using a window having a same length as that of a shortest carrier signal among the carrier signals.

14. The communication system as claimed in claim 10, wherein the integrator sets a range of the lengths of the carrier signal that corresponds to a data bit combination using a window having a same length as that of a longest carrier signal among the carrier signals.

15. The communication system as claimed in claim 1, wherein the carrier signal generator generates at least one of a chaotic signal, an impulse signal, and a spreading sequence signal.

16. The communication system as claimed in claim 10, wherein a number of the predetermined combinations of data bits is represented by a sequence of at least two numbers using '0' or '1'.

17. A communication system using a length shift keying (LSK) modulation method, the communication system comprising:
a transmitter that includes a carrier signal generator that generates carrier signals, and a modulator that modulates lengths of the carrier signals generated by the carrier signal generator according to combinations of data bits and outputs the modulated carrier signals; and
a receiver that includes an integrator that calculates an energy value by integrating a carrier signal that corresponds to a data bit combination, and a data judgment unit that judges the data bit combination by comparing the energy value with a predetermined threshold value.

18. The communication system as claimed in claim 17, wherein a number of predetermined combinations of data bits is represented by a sequence of at least two numbers using '0' or '1'.

19. A communication system using a length shift keying (LSK) modulation method, the communication system comprising:
means for generating carrier signals;
means for modulating lengths of the carrier signals according to combinations of data bits;
means for outputting a communication signal including the modulated carrier signals; and
means for receiving the output communications signal, the means for receiving comprising:
means for calculating an energy value by integrating the carrier signal corresponding to a data bit combination; and
means for judging the data bit combination by comparing the energy value with a predetermined threshold value.

20. The communication system as claimed in claim 19, wherein a number of the predetermined combinations of data bits is represented by a sequence of at least two numbers using '0' or '1'.

21. A length shift keying (LSK) modulation method comprising:
   generating carrier signals by a carrier signal generator;
   modulating, by a modulator, lengths of the carrier signals according to predetermined combinations of data bits; and
   outputting a communication signal including the modulated carrier signals,
   wherein in the modulating, the lengths of the carrier signals are modulated two different lengths according to each predetermined combination of data bits.

22. The method of claim 21, further comprising:
   receiving the output communications signal, said receiving comprising:
   integrating, by an integrator, the carrier signal corresponding to a data bit combination to calculate an energy value; and
   judging, by a data judgment unit, the data bit combination by comparing the energy value with a predetermined threshold value.

23. The method of claim 21, wherein a number of the predetermined combinations of data bits is represented by a sequence of at least two numbers using '0' or '1'.

* * * * *